Nov. 21, 1967 R. A. GANGE 3,354,441

CRYOELECTRIC CIRCUITS

Filed Aug. 24, 1962 4 Sheets-Sheet 1

INVENTOR.
ROBERT A. GANGE
BY
Samuel Cohen
Attorney

Nov. 21, 1967 R. A. GANGE 3,354,441

CRYOELECTRIC CIRCUITS

Filed Aug. 24, 1962 4 Sheets-Sheet 2

INVENTOR.
ROBERT A. GANGE
BY Samuel Cohen
Attorney

INVENTOR
ROBERT A. GANGE
BY
Samuel Cohen
Attorney

INVENTOR
ROBERT A. GANGE
BY
Samuel Cohen
Attorney 3,354,441
Patented Nov. 21, 1967

3,354,441

CRYOELECTRIC CIRCUITS

Robert A. Gange, Skillman, N.J., assignor to Radio Corporation of America, a corporation of Delaware Filed Aug. 24, 1962, Ser. No. 219,143
3 Claims. (Cl. 340—173.1)

This invention deals with cyroelectric circuits and is concerned with the problem of switching an input current into a desired one of a number of current paths.

An object of the invention is to provide a cryoelectric selection system which is capable of operating at relatively high speeds, which can be made to have very large capacity, and which is relatively simple to construct and control.

Another object of the invention is to provide a memory system which can have very large capacity and which can be made to operate at relatively high speeds.

The switching system of the invention includes a plurality of multiple path networks stacked one over another, and means coupled to the networks for selectively controlling, in unison, the inductance exhibited by different paths through the networks. More specifically the invention includes a plurality of like, multiple path networks, which may be formed of superconductors or other conductors, stacked one over another. Superconductor control elements are located adjacent to the paths in the outermost networks. When the control elements for all except a desired path in the outermost neworks are switched out of the superconductive state, only the desired path in *all* of the networks exhibits a relatively low value of inductance. All other paths in all networks exhibit a relatively high value of inductance. Under these conditions, drive current pulses applied to $q$ of the networks in the stack, steer into that desired path in all $q$ networks, where $q$ is an integer.

The invention is described in greater detail below and is illustrated in the following drawings of which:

Throughout the figures, similar reference numerals are applied to similar elements. Also, though not shown, it is to be understood that the circuits discussed are maintained at a low temperature, such as a few degrees Kelvin, at which superconductivity is possible.

Figure 1:
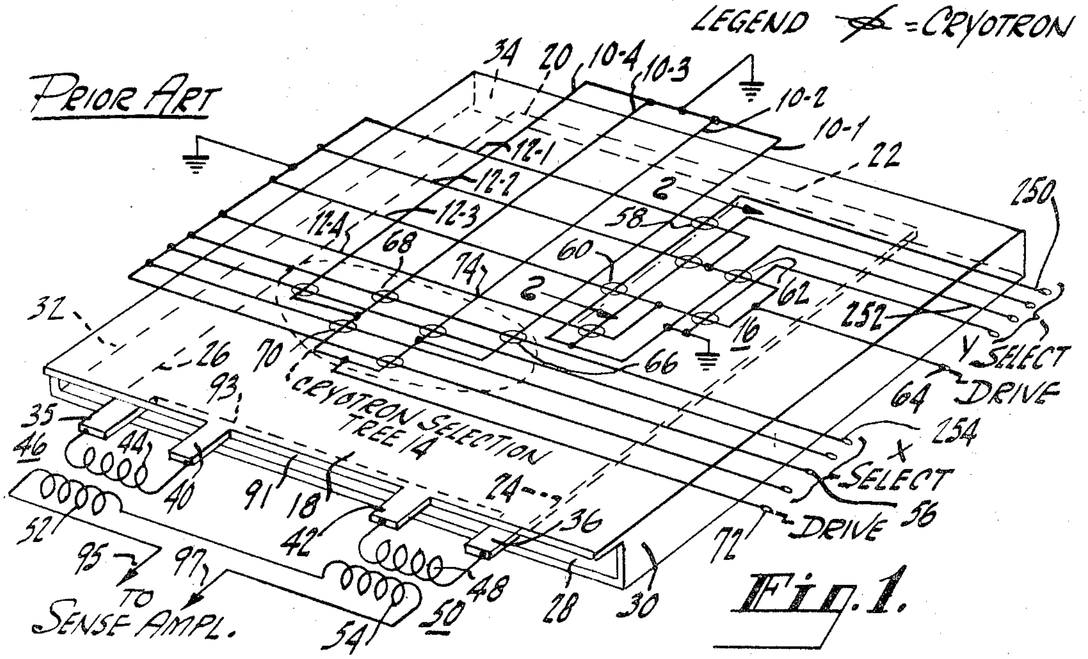
FIGURE 1 is a perspective, schematic representation of a prior art memory which is used to help explain the problem dealt with in the present invention.

The explanation which follows of the prior art memory of FIG. 1 is to orient the reader with respect to the problem dealt with and solved by the present invention. This memory includes four $x$ drive wires 10–1 to 10–4 and four $y$ drive wires 12–1 to 12–4. These wires are electrically insulated from one another, however, although present, no insulation is shown in the schematic perspective view of FIG. 1. The $x$ drive wires are connected to a cryotron selection tree 14 and the $y$ drive wires are connected to a cryotron selection tree 16.

A superconductor memory plane 18 is located beneath the drive wires. A second conductive plane 20 which may be a superconductor or not is arranged parallel to the memory plane 18. There is insulation, such as silicon monoxide, between the second plane 20 and plane 18. The second plane 20 is the "sense plane." The sense plane 20 is joined at one edge 22 to the superconductor memory plane 18. At its other edges 24 and 26 and 93 the sense plane is not joined to the memory plane.

A third plane 28, hereafter termed a "shield plane," is parallel to and located beneath the sense plane 20. Again, insulation, such as silicon monoxide, is present between the sense plane and the shield plane. Three edges 30, 32 and 34 of the memory plane 18 are folded down and joined to the shield plane 28. The folded down sections 30 and 32 are spaced from the respective opposite edges 24 and 26 of the sense plane.

One pair of output terminals 35 and 36 extend from the opposite edges 26 and 24, respectively, of the sense plane 20. Another pair of output terminals 40 and 42 extend from the memory plane 18. Terminals 35 and 40 are connected to one another by the primary winding 44 of a transformer 46. Terminals 36 and 42 are connected by the primary winding 48 of a transformer 50. The secondary windings 52 and 54 of the respective transformers are connected in series aiding relation and produce an output which is applied to the sense amplifier (not shown).

In the operation of the memory of FIG. 1, information may be written into or read out of the memory by applying appropriate signals to particular ones of the $x$ and $y$ select input terminals. For example, assume that signals (currents) are applied concurrently to select input terminals 250, 252, 254 and 56. The signal applied to terminal 250 drives cryotrons 58 and 60 "normal" (that is, the gate electrodes of these cryotrons are driven to their higher resistance state). The signal applied to terminal 252 drives cryotron 62 normal. The only path therefore which remains superconducting between the $y$ drive terminal 64 and ground is the one leading through $y$ drive wire 12–4. In a similar manner, the signals applied to terminals 254 and 56 drive cryotrons 66, 68 and 70 normal. The only superconducting path remaining for a drive current applied to $x$ drive terminal 72 is the one through $x$ drive wire 10–2. Under these conditions, the memory location selected is the one at the intersection of $y$ and $x$ drive wires 12–4 and 10–2, that is, location 74.

If the portion of the memory plane beneath intersection 74 is driven normal, the magnetic field produced by the two wires penetrates the superconductor plane and causes an output signal to be produced across output terminals 35, 40 and 42, 36 of the parallel planes 18, 20. These signals may be taken from the primary windings 44 and 48. The transformers 46 and 50 are so wound that these signals add at the secondary windings 52, 54 and produce a relatively large amplitude signal which is applied to the sense amplifier. The latter may be a pulse type amplifier (not shown), and may be located outside of the cryostat containing the memory.

In order to simplify the showing of the memory of FIG. 1, only 16 storage locations are illustrated and the cryotron selection trees each have only four possible paths. In practice, both the memory and the cryotron selection trees may be much larger. For example, the memory may have 128 columns and 128 rows—a total capacity of over 16,000 "bits." However, in a number of applications it is desired to increase the capacity of the memory even over this value by a substantial amount.

One way the memory capacity can be increased is to stack the memory planes one over another and to stack the selection trees one over another. For example, if 50 systems such as shown in FIG. 1, each of which has a capacity of over 16,000 bits, are stacked one over the other, the total memory system capacity will be more than 800,000 bits. However, stacking in this way introduces problems as illustrated schematically in FIG. 2.

Figure 2:
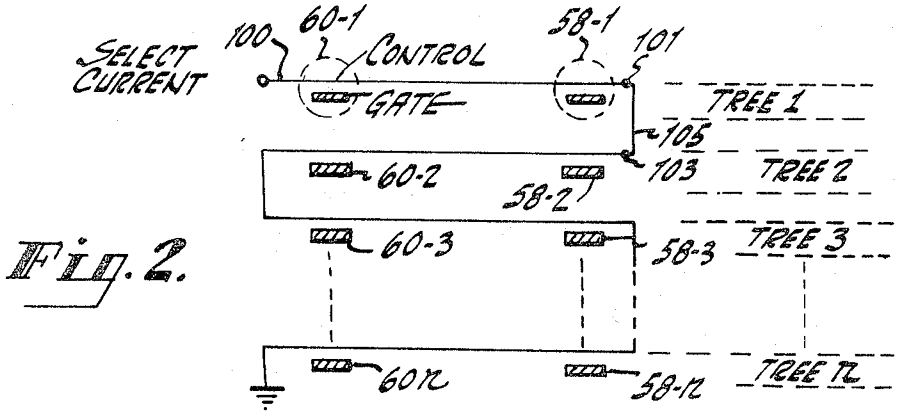
FIGURE 2 is a schematic, cross-sectional view illustrating the path a selection line to the control electrodes of cryotrons in cryotron selection trees would take if the selection trees were stacked one over another.

Imagine *n* selection trees corresponding to tree 16 of FIG. 1 stacked one over another (*n* may have the value 50 as noted above). If a section were taken along line 2—2 of FIG. 1 of such a stack, the arrangement of FIG. 2 would be seen. In this arrangement, for the purposes of simplicity, the ground planes (actually extensions of the memory plane) for the cryotrons are omitted. It would be desired in such an arrangement to select corresponding memory locations in each of the *n* planes. These corresponding locations would, in this case, correspond to an *n* bit word (ont bit per plane times *n* planes). To select desired locations in all planes, corresponding cryotrons in each tree are switched normal at the same time, increasing the resistance of all nonselected paths. For example, it is desired simultaneously to apply a select current to the control electrodes of cryotrons 60–1 and 58–1 in tree 1, 60–2 and 58–2 in tree 2, 60–3 and 58–3 in tree 3 and so on. This may be accomplished by winding the select current line 100 in zig-zag fashion through each and every tree, as shown in FIG. 2. Winding the line 100 in this manner causes its inductance to be extremely high because of the turns in the line and the length of the line—so high in fact that the time required for the selection current to pass through the line may become excessive. Further, the connections between the lines for the different trees as, for example, at 101 and 103 introduce impedance matching problems. Also, the connecting lead 105 introduces noise problems due to radiation from the lead. In brief, increasing the memory capacity in the way described introduces interconnection problems, impedance matching problems and noise problems, and increases the read-write cycle time to an undesirable extent.

Figure 3:
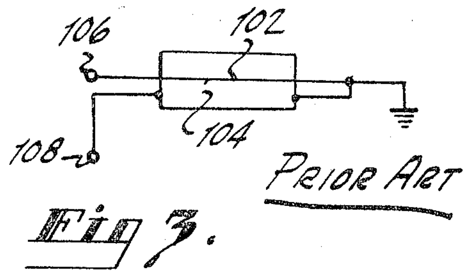
FIGURE 3 is a schematic showing of a prior art device known as a ryotron.
Figure 4:
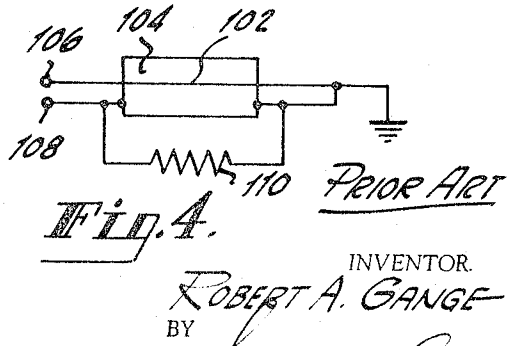
FIGURE 4 is a schematic showing of another type of ryotron, also in the prior art.

The switching arrangement of the present invention employs the device shown in FIG. 3 or the one shown in FIG. 4. This device is now known as a "ryotron."

The arrangement of FIG. 3 includes a first superconductor element 102 closely adjacent to and insulated from a superconductor element 104 known as a control ground plane. A signal or drive current is applied to input terminal 106 and a control current may be applied to input terminal 108. When the control ground plane 104 is in its superconducting state, it acts as a magnetic field shield and the inductance of lead 102 is relatively low. However, when a control current of an amplitude greater than the critical current for the control ground plane is applied to terminal 108, the control ground plane 104 is driven to its normal state and ceases to be a magnetic field shield and the inductance of lead 102 increases greatly.

In the ryotron of FIG. 4, a resistor 110 of relatively small value (say $10^{-3}$ to $10^{-4}$ ohms) is placed in shunt with the control ground plane 104. This permits the control ground plane to be driven from its superconducting to its intermediate rather than to its normal state by the application to terminal 108 of a control current which slightly exceeds the critical current of the control ground plane. The advantages of the ryotron of FIG. 4 over the one of FIG. 3 include lower power requirements.

Figure 5:
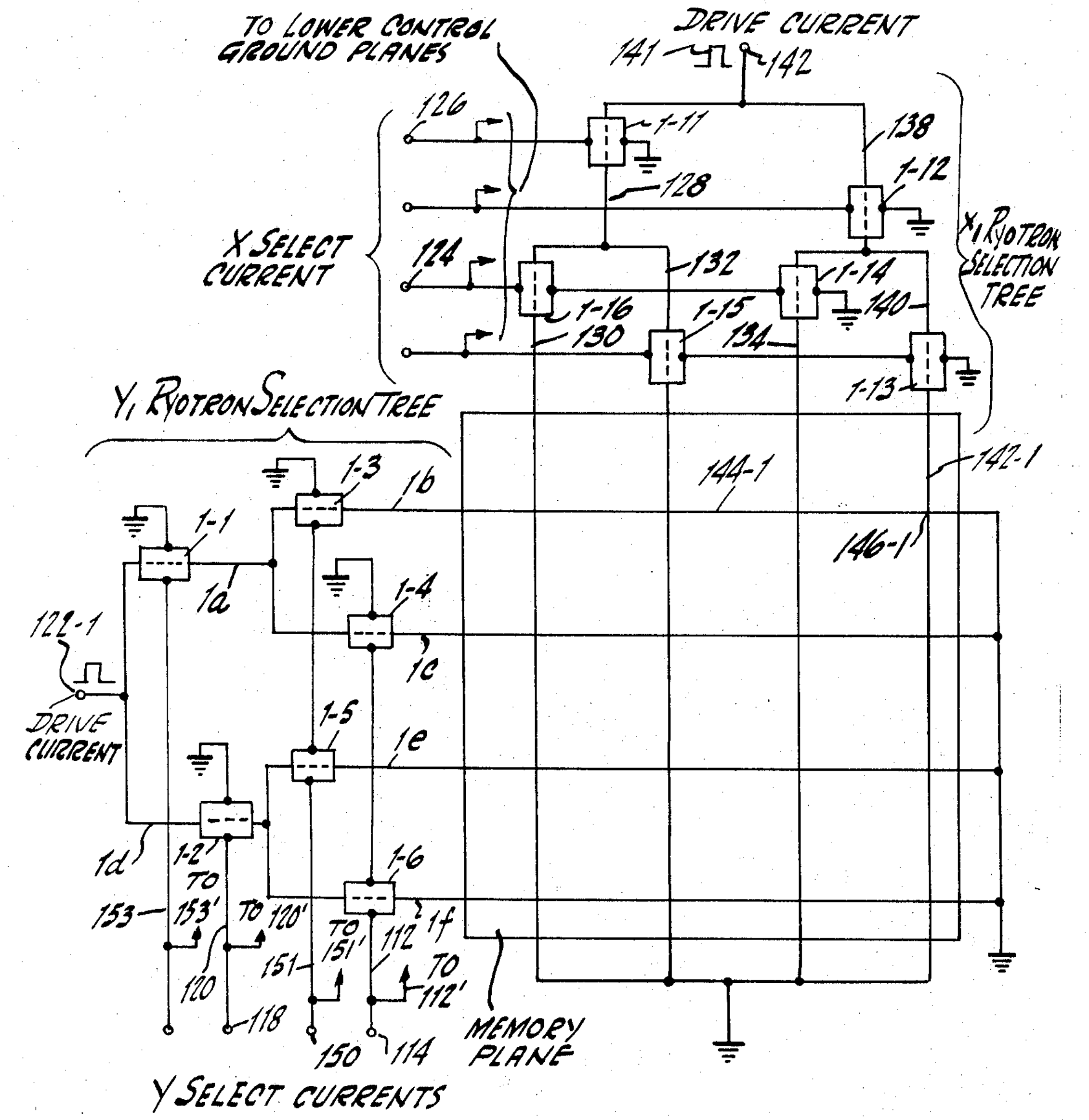
FIGURE 5 is a plan, schematic view of an embodiment of the invention in which a stack of ryotron selection trees are coupled to a stack of memory planes. Only the topmost memory plane and the topmost selection trees can be seen in FIG. 5.

The topmost of a stack of memory planes and the topmost of a stack of X and Y ryotron selection trees of a system embodying the invention are shown in FIG. 5. While in practice the number of memory locations may be very large (and the trees correspondingly large) only 16 memory locations (the intersections of 4 columns and 4 rows) per plane, are shown. The $Y_1$ selection tree includes six control ground planes (one per branch of the tree) 1–1 through 1–6. The $X_1$ ryotron selection tree also includes six control ground planes, namely 1–11 through 1–16. The memory may be like the memory of FIG. 1. Only the memory plane portion is visible in FIG. 5. The sense plane and output leads from which the sense signal is taken are not shown in FIG. 5 in order to simplify the figure.

Figures 6, 7:
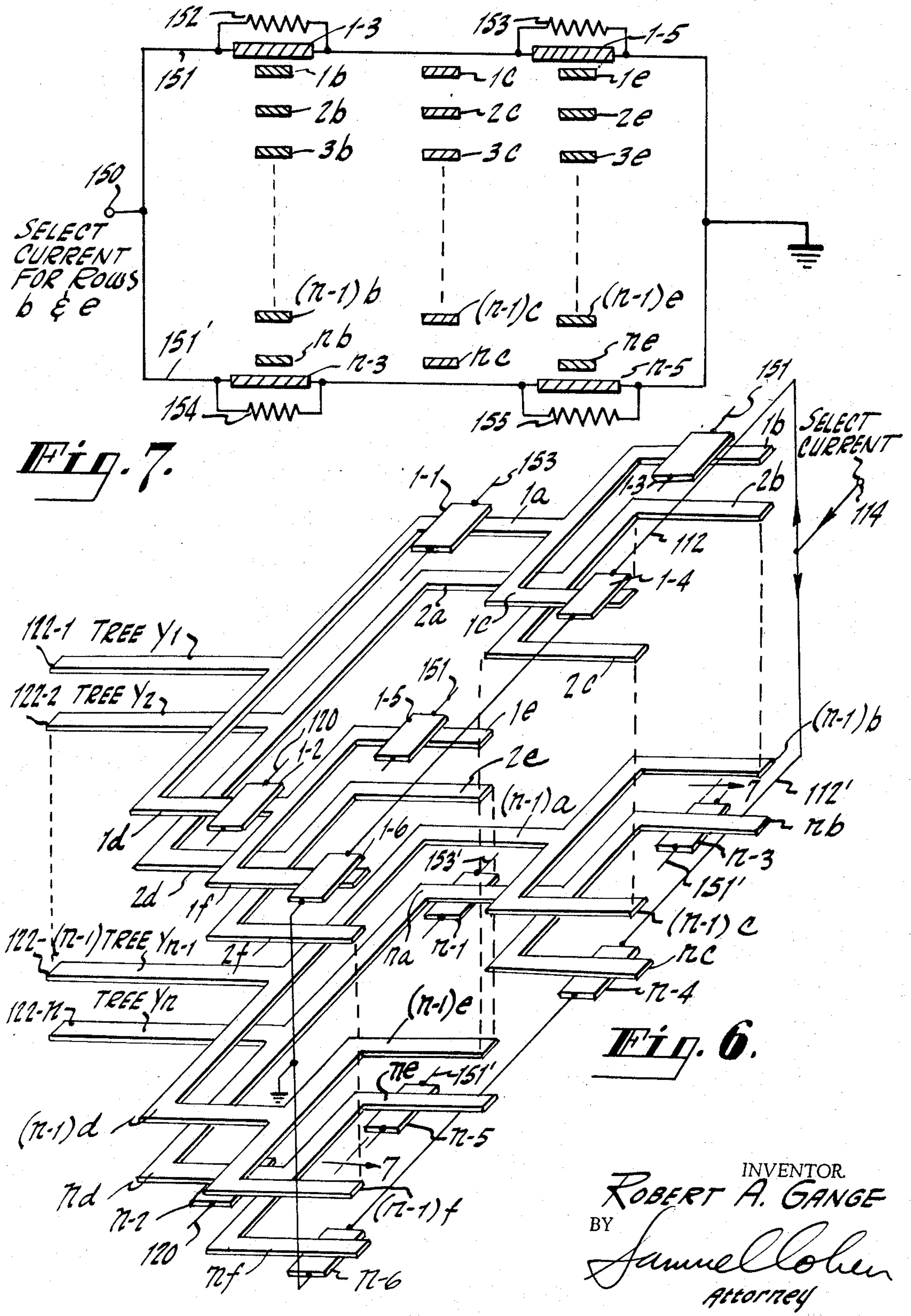
FIGURE 6 is an exploded perspective view showing, in part, the Y selection tree of FIG. 5.
FIGURE 7 is a cross-sectional view along line 7—7 of FIG. 6.

An exploded perspective view of the stack of Y selection trees appears in FIG. 6. The tree conductors are preferably superconductors to lessen power dissipation, however, nonsuperconducting material such as silver, aluminum or the like, or a superconductor material in its normal state, may be used. The X selection trees correspond to the ones shown in FIG. 6 and are therefore not shown separately. The select current line 112 of FIG. 5 is shown in FIG. 6. The select current lines to the other control ground planes such as 1–1 and *n*–1, 1–2 and *n*–2, and 1–3, 1–5, *n*–3 and *n*–5 are shown only in part in FIG. 6 to simplify the drawing. Also, it is to be understood that in a preferred form of the invention each control ground plane has connected in shunt therewith a resistor to enable the control ground plane to be placed in the intermediate rather than the normal state. This resistor is not shown in FIG. 6 but is illustrated for some ground planes in FIG. 7.

As may be seen in FIG. 6, a control ground plane such as 1–1, 1–2, 1–3, 1–4, etc. is located adjacent to each branch *a*, *d*, *b*, *c*, etc., respectively, of the topmost selection tree $Y_1$. In a similar manner, a control ground plane is located adjacent to each branch of the bottom most selection tree $Y_n$. All selection trees between the topmost tree and the bottommost tree are superconductors (or conductors) and do not require control ground planes individual to these branches.

In the operation of the circuits of FIGS. 5 and 6, it is desired to select the same (that is, corresponding) current paths through all of the trees. For example, assume it is desired to select only the paths leading to branches 1*b*, 2*b*, . . . (*n*–1)*b* and *n*b. To do this, a select current is applied to input terminal 114. This current passes through line 112 to control ground planes 1–4 and 1–6 and through line 112′ to control ground planes *n*–4 and *n*–6. These four control ground planes therefore switch out of the superconducting state. When this occurs, all of the branches located between control ground planes 1–4 and *n*–4 switch from a low value of inductance to a high value of inductance. In other words, any current (pulses) attempting to enter paths 1*c*, 2*c*, . . . (*n*-1)*c* and *n*c see a relatively large value of inductance. In a similar manner, the branches between control ground planes 1–6 and *n*–6 that is, branches 1*f*, 2*f*, . . . (*n*–1)*f* and *nf*, all exhibit a relatively high value of inductance. At the same time, a select current is applied from input terminal 118 to lines 120 and 120′ (FIG. 5) (the terminal is not shown in FIG. 6) to control ground planes 1–2 and *n*–2. This select current drives control ground planes 1–2 and *n*–2 out of the superconducting state so that branches 1*d*, 2*d*, . . . (*n*–1)*d* and *nd* all exhibit a relatively high value of inductance.

It should be mentioned here that the spacing between corresponding control ground planes such as 1–1 and *n*–1 is greatly exaggerated in the exploded view of FIG. 6. In practice, the conductors such as 1*a* . . . *na* may each be 500–1,000 Angstroms thick. The insulation, such as silicon monoxide, between successive trees may be 3,000 Angstroms or less thick. In a system in which say 50 trees are stacked one over another, the spacing between the ground planes may therefore be roughly 200,000 Angstroms=0.002 cm. or, if as suggested later, thicker insulation (about 32,000 A.) is used between conductors, the spacing between ground planes will still be less that 0.02 cm. Clearly therefore two planes such as 1–1 and *n*–1, when in the superconducting state, act as an extremely good magnetic field shield to *all* conductors such as 1*a*, 2*a* . . . *na* located between these planes. Further, although two planes per stack of branches, positioned as shown, are preferred, the invention will operate with one plane per stack. Further, this plane need not be adjacent to an outermost branch of a stack of branches but may instead be centered or otherwise "buried" in the stack. Alternatively, more than one plane per stack may be "buried" in the stack.

If during the time control currents are applied to terminals 118 and 114 input drive current pulses are applied to the convergent end of one or more of the tree networks, that is, to one or more of terminals 122–1, 122–2, . . . 122–(*n*–1) and 122–*n* (or if during the time drive currents are applied to the convergent end of one or more of the tree networks, control currents are applied to terminals 118 and 114) these drive currents inductively divide among the paths. As the inductance of branches *a* and *b* is much less than that of the other branches, the drive currents flow substantially entirely into branches *a* and *b*. As may be seen in FIG. 5, leads 1*b* correspond to a row (144–1) in the memory. Therefore, corresponding rows of all memory planes may be supplied with current in this manner.

In a manner similar to that discussed above, the stacked X ryotron selection trees may be controlled to cause the selection of corresponding columns in all of the memory planes. For example, if select currents are applied to input terminals 124 and 126 (FIG. 5), the paths 128, 130 and 134 will all exhibit a relatively high value of inductance. However, the path 138, 140 exhibits a low value of inductance. A drive current pulse 141 applied to terminal 142 inductively divides among the various paths and, as the path 138, 140 has by far the lowest value of inductance, substantially the entire current flows through the path 138, 140 and into column lead 142–1.

Under the conditions above, that is, the selection of column lead 142–1 and row lead 144–1, the memory location 146–1 in the topmost plane is selected. Corresponding memory locations in all other planes are also selected. In the case of *n* planes stacked one over another, the word written in has up to *n* bits (where *n* is the number of memory planes). In the case of an *n* bit word, the first bit is in location 146–1 in the first memory plane, the second bit is in location 146–2 (not visible in FIG. 5) in the next memory plane . . . and the last bit is in location 146–*n* (not visible in FIG. 5) in the last memory plane. These locations 146–1 through 146–*n* are aligned one over another in the *z* direction, that is, in the direction perpendicular of the plane of the paper in FIG. 5.

FIG. 7 is a sectional view along lines 7—7 of FIG. 6 (the select current lines 151 and 151′ which are not shown in FIG. 6 are illustrated in FIG. 7). It shows the manner in which the control ground planes 1–3, 1–5, and *n*–5 are connected to common input select current terminal 150. Resistors 152–155 are connected in shunt with ground planes 1–3, 1–5, *n*–3 and *n*–5, respectively. Note that the control ground planes 1–3 and *n*–3 associated with the topmost and bottom most selection trees, respecively, control all of the *b* paths located between these control planes. In a similar manner, the control ground planes 1–5 and *n*–5 control all of the *e* paths of the stack of selection trees.

The arrangement of FIGS. 5–7 has important advantages over the arrangement shown in FIG. 2. Note that only two select current lines are required to control a very large number of paths through the stack of selection trees. These two lines are relatively straight and short and have relatively low inductance. Therefore, the memory speed which is possible, that is, the read-write operating frequency which is possible, is relatively high. Moreover, the construction of the stacked selection trees is relatively simple. The outermost trees have adjacent to each branch through the trees, a control ground plane. The remaining trees are simply conductors which may be formed of lead for example and which are controlled by the control ground planes adjacent to the outermost trees. Also, the previously mentioned problems of impedance matching, radiation and so on are minimized or eliminated.

The selection matrices of the present invention may be formed of sheet material. However, they are preferably fabricated by vacuum deposition. When vacuum deposition is used and the material used is a superconductor, it is preferred that the material employed be lead or some other "hard" superconductor. It is also preferable that the film thickness be relatively small—500 Angstroms or less. The purpose of making the matrices of films this thin is to reduce the tendency of one film to act like a magnetic field shield on the adjacent films. Note that as the film thickness decreases $\lambda$ the field penetration depth, increases and the tendency, if any, of the film to act as a shield to a magnetic field decreases. Also, the thinner film, in its normal state, acts like a higher value of inductance but, in its superconductive state still retains its relatively low value of inductance. Thus, the thinner film has relatively higher "gain" than the thicker film.

Throughout the various figures it it to be understood that insulation is present between each control ground plane and the conductor associated with that ground plane. It is also to be understood that there is insulation present between the successive selection trees and, between the control ground planes and the resistors and/or high permeability members (described later). This insulation may be silicon monoxide which may be laid down by vacuum deposition. To simplify the drawing, the insulation between various elements is shown as air rather than silicon monoxide.

In fabricating a stacked structure according to the present invention, the memory, if like the one of FIG. 1, will have a number of layers of different materials. For example, the layers include a substrate and possibly a layer of insulating material on the substrate, the shield plane on top of the insulation, another layer of insulation, the sense plane, another layer of insulation, the memory plane, another layer of insulation, the row conductors, another layer of insulation, the column conductors, and finally another layer of insulation. The total number of layers therefore (not counting the final layer) is eleven or so. Assuming 3,000 Angstroms per layer, the total thickness required for one memory of a stack of memories is some 33,000 Angstroms. It has been stated that it is preferred that the conductors of which the selection trees are made be 500 Angstroms or less. If desired, the successive stacked selection trees may be brought up to level with the column or row conductors, by increasing the thickness of the insulation between successive trees (although it is not essential that this be done). For example, the insulation between successive trees can be 32,500 Angstroms or so.

Two general forms of the system of the present invention have been described. In one, the control ground planes may be switched between superconducting and normal states. In the second, each control ground plane has associated with it a resistor. This permits the control ground plane to be switched between superconducting and intermediate states. In the embodiment of the invention shown in part in FIG. 8, each control ground plane has associated with it an element formed of a high magnetic permeability material. These elements are shown at 160, 162, 164 and 166. Each element is on the side of the superconductor control ground plane opposite from the branches of the selection tree. Each superconductor element has associated with it also a resistor just as in the embodiment of FIG. 7.

Figure 8:
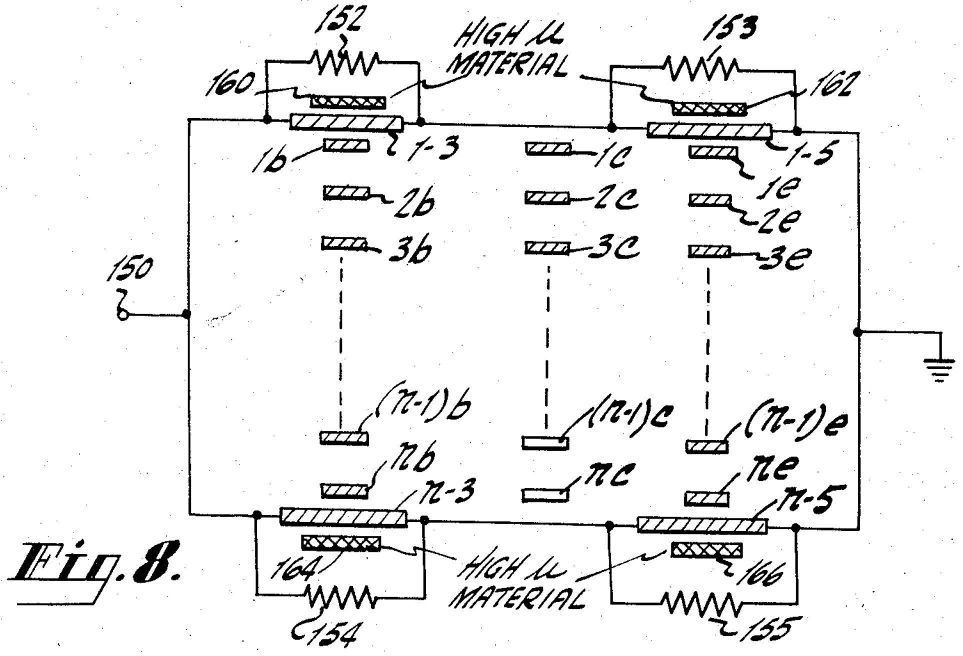
FIGURE 8 is a schematic showing of an embodiment of the invention employing a modified form of ryotron selection tree system.

In the operation of the system of FIG. 8, a control current applied to input terminal 150 places the control ground planes 1–3, *n*–3, 1–5 and *n*–5 in the intermediate state. This removes the shielding from between the high permeability magnetic materials 160, 164 and the selection tree branches *b* and removes also the shielding between the high permeability elements 162, 166 and the selection tree branches *e*. The effect of the high permeability material when the shielding is removed is to greatly increase the inductance of the paths *b* and *e* over what the inductance would be in free space, that is, over what the inductance would be with the arrangement of FIG. 7.

The material of which elements 160, 162, 164 and 166 is made may be a ferromagnetic material such as iron, permalloy, one of the many ferrites, or the like. A linear material is preferred, that is, one having no, or substantially no hysteresis. Many of the ferrites and permalloy materials which exhibit square hysteresis loops at room temperature have much less hysteresis in the low temperature environment at which the circuits of the present invention are operated, and are therefore suitable.

While FIG. 8 shows only a portion of the selection tree system of the present invention, it is to be understood that in this embodiment of the invention, the remaining control ground planes (not shown) of the system may also have associated with them a high permeability material. In each case, the high permeability element such as 160 is shielded from the branches aligned with the control ground plane associated with that element by the control ground plane such as 1–3, when the control ground plane is in its superconducting state.

Figure 9:
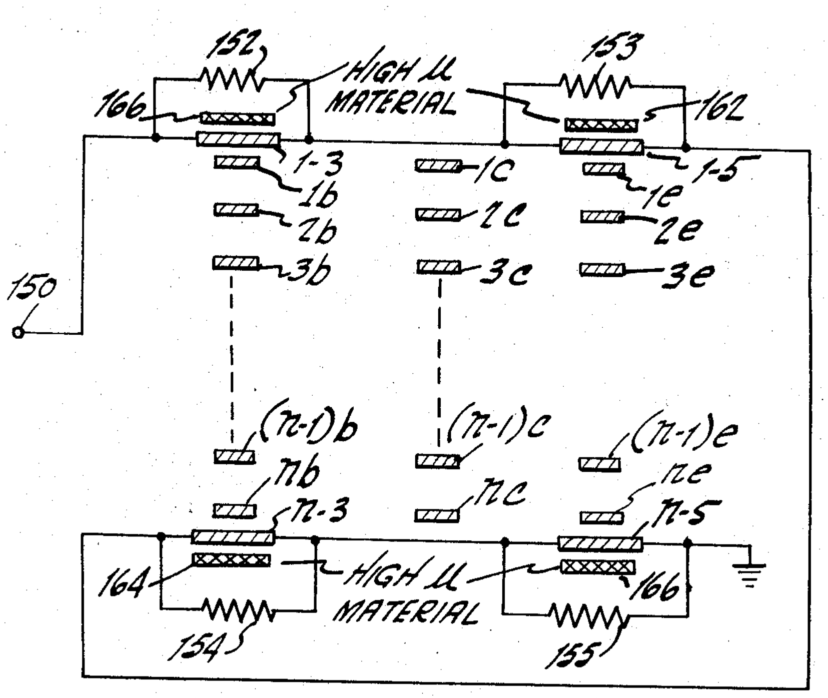
FIGURE 9 is a schematic showing of another embodiment of the invention employing a different form of ryotron selection tree system.

In the various embodiments of the invention shown, the topmost and bottommost control ground planes are connected in parallel. It is to be understood that they may be connected in series instead as shown, for example, in FIG. 9. FIG. 9 is based on FIG. 8 but is equally applicable to the embodiments of FIGS. 7 and 5.

In the various embodiments of the invention, it may be desirable to reduce the tendency of a control ground plane to assume the normal state due to the magnetic field generated by current flow through tree branches aligned with that ground plane. This may be accomplished by operating the system at a temperature substantially lower than the critical temperature for the control ground plane material. Or, the control ground plane may be made of a material such as indium, having a relatively high critical temperature. Also, the geometry of the ground plane may be made such as to require a much larger magnetic field to switch into the intermediate or normal state than the net fields produced by the currents passing through the tree branches associated with said ground planes.

Select currents are employed in the different embodiments of the invention illustrated to switch the control ground planes between superconducting and non-superconducting states. It is to be understood that forms of energy other than currents may be used instead. Examples of other forms include magnetic fields, radiation fields, such as infrared, ultraviolet, etc., heat, mechanical energy and so on.

What is claimed is:

1. In combination, a plurality of substantially identical two dimensional superconductor tree networks stacked one over another and insulated from one another arranged with corresponding branches of each tree network in corresponding positions in each network; and means coupled to said networks for controlling, in unison, the inductance exhibited by each stack of aligned branches in said networks, said means including for each stack of aligned branches, not more than a single pair of superconductor control elements, each such pair of control elements, when in the superconductive state, providing a magnetic field shield to all branches aligned with that pair of elements, and, when in the nonsuperconductive state, permitting the inductance exhibited by all branches aligned with that pair of elements substantially to increase, and means coupled to said elements for selectively switching said elements between superconductive and nonsuperconductive states.

2. A memory system comprising, in combination:

2 *n* superconductor pyramid tree networks, each having an input terminal and a plurality of output terminals, *n* of said networks being stacked one over another in one group and *n* of said networks being stacked one over another in a second group;

*n* groups of row superconductors, each group connected to the respective output terminals of a different tree in said one group;

*n* groups of column superconductors, each group connected to the respective output terminals of a different tree in said second group, each group of column conductors intersecting with a different group of row conductors;

*n* superconductor memory planes, each lying beneath a group of intersecting column and row conductors;

and superconductor control means adjacent to the branches in the first and second groups of pyramid tree networks, not more than a single pair of control means per stack of branches for selectively controlling the inductance exhibited by the current paths through all networks.

3. A memory system comprising, in combination:

2 *n* superconductor pyramid tree networks, each having an input terminal and a plurality of output teminals, *n* of said networks being stacked one over another in one group and *n* of said networks being stacked one over another in a second group;

*n* groups of row superconductors, each group connected to the respective output terminals of a different tree in said one group;

*n* groups of column superconductors, each group connected to the respective output terminals of a different tree in said second group, each group of column conductors intersecting with a different group of row conductors;

*n* superconductor memory planes, each lying beneath a group of intersecting column and row conductors;

superconductor control means adjacent to the branches in the first and second groups of pyramid tree networks, not more than a single pair of control means per stack of branches for selectively controlling the inductance exhibited by the current paths through all networks;

and elements having a permeability substantially greater than one, each located adjacent to a different control plane and shielded from the pyramid trees by the control plane when the latter is in its superconductor state.

References Cited

UNITED STATES PATENTS

| | | | |
|---|---|---|---|
| 2,989,714 | 6/1961 | Park | 340—173.1 |
| 3,015,809 | 1/1962 | Myers | 340—166 |
| 3,043,512 | 7/1962 | Buckingham | 340—173.1 |
| 3,047,744 | 7/1962 | Pankove | 307—88.5 |
| 3,075,184 | 1/1963 | Warman et al. | 340—166 |
| 3,106,648 | 10/1963 | McMahon | 307—88.5 |
| 3,181,002 | 4/1965 | Stabler | 340—173.1 |
| 3,191,063 | 6/1965 | Ahrons | 307—88.5 |
| 3,238,512 | 3/1966 | Alphonse | 340—173.1 |
| 3,259,887 | 5/1966 | Garwin | 340—173.1 |

OTHER REFERENCES

IBM Technical Disclosure Bulletin II, vol. 3, No. 10, March 1961, pp. 118–119.

IBM Technical Disclosure Bulletin I, vol. 3, No. 10, March 1961 (p. 105).

TERRELL W. FEARS, *Primary Examiner.*

NEIL C. READ, *Examiner.*

P. XIARHOS, *Assistant Examiner.*